United States Patent
Seger et al.

(10) Patent No.: US 12,440,793 B2
(45) Date of Patent: Oct. 14, 2025

(54) PLEATED FILTER ELEMENT FOR AIR FILTER

(71) Applicant: Camfil AB, Stockholm (SE)

(72) Inventors: Fredrik Seger, Rönninge (SE); Richard Ringström, Dalsöfors (SE); Kenny Hedlund, Trosa (SE); Mageshvaran Muthu Krisnan, Parit (MY)

(73) Assignee: Camfil AB, Stockholm (SE)

( * ) Notice: Subject to any disclaimer, the term of this patent is extended or adjusted under 35 U.S.C. 154(b) by 466 days.

(21) Appl. No.: 17/782,155

(22) PCT Filed: Dec. 14, 2020

(86) PCT No.: PCT/EP2020/085978
§ 371 (c)(1),
(2) Date: Jun. 2, 2022

(87) PCT Pub. No.: WO2021/122455
PCT Pub. Date: Jun. 24, 2021

(65) Prior Publication Data
US 2023/0001342 A1    Jan. 5, 2023

(30) Foreign Application Priority Data
Dec. 20, 2019    (SE) .................................. 1951541-0

(51) Int. Cl.
*B01D 46/00*    (2022.01)
*B01D 46/121*    (2022.01)
(Continued)

(52) U.S. Cl.
CPC ....... *B01D 46/522* (2013.01); *B01D 46/0005* (2013.01); *B01D 46/121* (2022.01); *B01D 46/521* (2013.01); *B01D 46/56* (2022.01)

(58) Field of Classification Search
CPC .... B01D 46/56; B01D 46/0005; B01D 46/52; B01D 46/521; B01D 46/522
(Continued)

(56) References Cited

U.S. PATENT DOCUMENTS 8,328,895 B2    12/2012    Nicholas
2007/0157589 A1    7/2007    Haberkamp et al.
(Continued)

FOREIGN PATENT DOCUMENTS

CN    104343592 A    2/2015
DE    102004025274 A1    12/2004
(Continued)

OTHER PUBLICATIONS

Swedish Search Report for Patent Application No. 1951541-0 dated Jun. 8, 2020.
(Continued)

*Primary Examiner* — Robert A Hopkins
(74) *Attorney, Agent, or Firm* — Patterson + Sheridan, LLP (57) ABSTRACT

The present disclosure relates to pleated filter element comprising: a pleated filter media comprising a major upstream face and a major downstream face and comprising a plurality of oppositely-facing pleats extending between said major upstream face and said major downstream face such that the pleated filter media comprises a first corrugated edge and a second corrugated edge and a first noncorrugated edge and a second noncorrugated edge, wherein the pleated filter media comprises a main pleat section and a first edge pleat section at the first noncorrugated edge, wherein the length of the first edge pleat section is less than 50% of the total length of the pleated filter element between the first noncorrugated edge and the second noncorrugated edge, and/or wherein the maximum pleat height in the first edge
(Continued)

pleat section is lower than the maximum pleat height in the main pleat section. The present disclosure further relates to an air filter comprising the pleated filter element in a casing.

22 Claims, 7 Drawing Sheets

(51) Int. Cl.
    *B01D 46/52*     (2006.01)
    *B01D 46/56*     (2022.01)

(58) Field of Classification Search
    USPC .................................................. 55/489, 483
    See application file for complete search history.

(56) References Cited

U.S. PATENT DOCUMENTS

| | | |
|---|---|---|
| 2007/0270095 A1 | 11/2007 | Shimoyama et al. |
| 2010/0307118 A1* | 12/2010 | Kawano ............. B01D 39/1692 55/483 |
| 2015/0007732 A1 | 1/2015 | Hasenfratz et al. |
| 2015/0107201 A1 | 4/2015 | Cornaglia |
| 2017/0267069 A1 | 9/2017 | Bayerlein et al. |

FOREIGN PATENT DOCUMENTS

| | | | |
|---|---|---|---|
| DE | 102008058356 A1 * | 5/2010 | ........... B01D 46/522 |
| FR | 2855072 A1 | 11/2004 | |
| JP | H10-288372 A | 10/1998 | |

OTHER PUBLICATIONS

International Search Report for PCT Application EP2020/085978 dated Feb. 12, 2021.
Brazilian Office Action for Application No. BR112022010043-4 dated Mar. 25, 2024.
Chinese Office Action for Application No. 202080086813.0 dated Sep. 26, 2023.

* cited by examiner

PLEATED FILTER ELEMENT FOR AIR FILTER

FIELD OF THE INVENTION

The present invention relates generally to air filters, and more specifically to pleated filter elements useful in air filters. Examples of applications include air inlet filters for buildings, gas turbines, etc.

BACKGROUND OF THE INVENTION

Air filters comprising pleated filter elements disposed in a frame structure are used in a wide range of applications. Air filters are employed in a wide range of applications, from filtration of intake air in building ventilation systems to filtration of intake air for large-scale industrial facilities and equipment. The air filters are typically configured to be mounted in a filter holding structure. The filter holding structure may for example comprise a filter housing or filter bank grid, with one or more openings in which the filters are fitted.

Examples of filter types include, panel filters, deep pleat box filters and V-type filters. Panel filters typically comprise a pleated filter element arranged in a rectangular frame. A deep pleat box filter is essentially a type of panel filter with deeper pleats, causing the rectangular frame to adapt a more box-like shape. A V-type filter typically includes two or more pairs of pleated filter elements arranged in a V-configuration. One important application for V-type filters is as air intake filters in connection with gas turbine combustion systems employed for power generation. In such applications, high volumes of air are utilized in the combustion process. In turn, high volume air filtration is required to condition intake air streams for combustion optimization and for reducing wear on gas turbine components. In particular, the removal of relatively small particles and liquid is important to minimize degradation of turbine compressor blades leading to loss of compressor efficiency.

Each of the pleated filter elements may be comprised of a pleated particulate or gas filter element. A filter element is typically formed from a sheet of filter media, e.g. a fiberglass sheet, or a nonwoven polyester sheet or membrane media or combinations thereof or the like, which is pleated to increase the effective filtering area of the filter body. The filter media for particle separation has the specific ability to remove particles of different sizes from the air stream depending on the media type and will by that typically conform to the standard ISO 16890 or EN1822. A filter media for molecular filtration have similarly a specific ability to remove different types of gaseous compounds from the air stream. The gaseous compounds removed depend on the media type.

To provide mechanical support and/or to combine a plurality of filter elements, the filter elements are typically arranged in a frame structure. In order to secure the filter elements to the frame structure and prevent air from bypassing the filter elements, the filter elements are typically adhered and sealed against the frame structure by means of an adhesive.

In order to minimize the pressure drop of the filter, the effective area of the filter media should be as high as possible, and the obstructions of the air flow path caused by the filter frame should be as low as possible, while still providing adequate mechanical support. This is especially important in high air flow applications and applications where a high degree of separation is, such as gas turbine applications.

Due to the leak proof construction of the filter frame and element assembly, the adhesive used to seal the filter elements to the frame typically has to be added in liquid form to the already assembled or partially assembled filter. This can be challenging since the space available for adding the adhesive is very limited and any modification of the frame structure will typically have to be made at the expense of the amount of filter media and/or open area of the filter framework thus causing an increase in pressure drop.

SUMMARY OF THE INVENTION

One object of the present disclosure is to provide an air filter, which solves or ameliorates at least some of the problems associated with prior art air filters.

Another object of the present disclosure is to facilitate addition of a liquid adhesive for sealing the filter elements to the frame during production.

Another object of the present disclosure is to provide an air filter with a reduced pressure drop.

The above objects as well as other objects that will become apparent to the skilled person in the light of the present disclosure are achieved by the various aspects of the invention as set out herein.

According to a first aspect of the disclosure, there is provided a pleated filter element comprising:

a pleated filter media comprising a major upstream face and a major downstream face and comprising a plurality of oppositely-facing pleats extending between said major upstream face and said major downstream face such that the pleated filter media comprises a first corrugated edge and a second corrugated edge and a first noncorrugated edge and a second noncorrugated edge, wherein the pleated filter media comprises a main pleat section and a first edge pleat section at the first noncorrugated edge, wherein the length of the first edge pleat section is 1-50% of the total length of the pleated filter element between the first noncorrugated edge and the second noncorrugated edge, and wherein the maximum pleat height in the first edge pleat section is lower than the maximum pleat height in the main pleat section.

The term corrugated as used herein refers to a material or surface pleated or shaped into a series of parallel ridges and grooves. A corrugated material will typically have two corrugated (e.g. zig-zag shaped) edges and two noncorrugated (straight) edges.

The pleated filter element is preferably rectangular in shape and the size of the filter element is characterized by a length between the first noncorrugated edge and the second noncorrugated edge, in a direction perpendicular to the pleats, a width between the first corrugated edge and the second corrugated edge, in a direction parallel to the pleats, and a thickness between the major upstream face and the major downstream face, corresponding to the pleat height. The major upstream and major downstream surfaces are planes intersecting the upstream and downstream pleat tips respectively. In this document pleat height refers to the shortest distance between the major upstream face and the major downstream face, i.e. typically the distance in a direction orthogonal to the major upstream face or the major downstream face, or both. The length and thickness refer to the overall length and thickness of the filter element in the folded state and not to the length or thickness of the filter media in a stretched-out state. The inventive air filter is preferably a panel-type air filter, a deep pleat box air filter, or a V-type air filter. The overall length of the pleated filter elements in such filters, between the first noncorrugated edge and the second noncorrugated edge, in a direction perpendicular to the pleats, is typically in the range of 200-800 mm. Common lengths of the pleated filter elements between the first noncorrugated edge and the second noncorrugated edge, in a direction perpendicular to the pleats, are in the range of 200-700 mm, such as in the range of 200-400 or 250-350 mm, or in the range of 350-500 or 390-450 mm, or in the range of 500-700 or 550-650 mm.

The pleated filter element can be arranged in a casing to form an air filter, such as a panel filter, a deep pleat box filter, or a V-type filter. A panel filter or a deep pleat box filter typically comprises a pleated filter element arranged in a casing comprising a rectangular or box-like frame. A V-type filter typically includes two or more pairs of pleated filter elements arranged in a V-configuration in a casing. The corrugated and noncorrugated edges of the filter element are typically enclosed in one or more channels in the casing where they can be sealed to the casing by adding a liquid adhesive in the channels and allowing the liquid adhesive to solidify.

The pleated filter element comprises a section of pleats at the first noncorrugated edge, referred to herein as the first edge pleat section, wherein maximum pleat height in the first edge pleat section is lower than the maximum pleat height in the main pleat section. The reduced pleat height in the first edge pleat section allows for the size of the channels in the casing to be reduced, thereby reducing obstructions of the air flow path caused by the filter frame and leading to a lower overall pressure drop. The reduced pleat height in the first edge pleat section can also be used to increase the space available for adding the adhesive into the channels. The reduced pleat height in the first edge pleat section can also be used to achieve a combination of both reduced size of the channels in the casing and increased space available for adding the adhesive into the channels.

Each pleat section may have a single pleat height, but it is also possible that each pleat section has a range or sequence or gradient of different pleat heights. What is important for the purposes of the present disclosure is that the maximum pleat height in the first edge pleat section is lower than the maximum pleat height in the main pleat section. This allows for the edge pleat section to fit in a smaller channel, or for increasing the space available for adding the adhesive into the channels.

The size of the pleat sections is characterized by the length of the pleat section in a direction between the first noncorrugated edge and the second noncorrugated edge. This length refers to the overall length of the filter element in the folded state and not to the length of the filter media in a stretched-out state. The length of the first edge pleat section may preferably be adapted to correspond to the depth of the channel in which it is to be inserted and sealed. The depth of the channel may typically be in the range of a few mm to a few cm, for example in the range of 5-50 mm, and more typically in the range 10-30 mm. of However, it is also possible for the first edge pleat section to be much larger, e.g. such that the length of the first edge pleat section is up to 50% of the total length of the pleated filter element between the first noncorrugated edge and the second noncorrugated edge. This may for example be the case in an embodiment wherein the pleat height tapers from a middle pleat of the pleated filter element towards the first noncorrugated edge such that the pleated filter element has a maximum pleat height at the middle pleat and a minimum pleat height at the first noncorrugated edge pleat.

In some embodiments, the length of the first edge pleat section is 1-25%, preferably 1-20%, preferably 1-15%, preferably 1-10%, of the length of the pleated filter element between the first noncorrugated edge and the second noncorrugated edge. In a panel-type air filter, a deep pleat box air filter, or a V-type air filter, the length of the first edge pleat section in the range of 1-15% or 1-10% of the length of the pleated filter element between the first noncorrugated edge and the second noncorrugated edge is typically preferred as it will typically correspond to the depth of the channel in which the edge pleat section is to be inserted and sealed.

Common total lengths of the pleated filter elements between the first noncorrugated edge and the second noncorrugated edge, in a direction perpendicular to the pleats, are in the range of 200-700 mm, such as in the range of 200-400 or 250-350 mm, or in the range of 350-500 or 390-450 mm, or in the range of 500-700 or 550-650 mm. In some embodiments, the length of the first edge pleat section is in the range of 5-60 mm, preferably in the range of 5-50 mm, preferably in the range of 5-40 mm, preferably in the range of 5-30 mm, preferably in the range of 10-60 mm, preferably in the range of 10-50 mm, preferably in the range of 10-40 mm, preferably in the range of 10-30 mm, more preferably in the range of 10-25 mm.

The first edge pleat section comprises a series of pleats at the first noncorrugated edge. In some embodiments, the first edge pleat section comprises at least the first two, three, four, five, six, seven, eight, nine or ten pleats at the first noncorrugated edge.

In some embodiments, the pleated filter element further comprises a second edge pleat section at the second noncorrugated edge. The second edge pleat section may be identical to the first edge pleat section or different from the first edge pleat section.

In some embodiments, the pleated filter element further comprises a second edge pleat section at the second noncorrugated edge, wherein the length of the second edge pleat section is 1-50% of the total length of the pleated filter element between the first noncorrugated edge and the second noncorrugated edge, and wherein the maximum pleat height in the second edge pleat section is lower than the maximum pleat height in the main pleat section.

The reduced pleat height in the second edge pleat section allows for the size of the channels in the casing to be reduced, thereby reducing obstructions of the air flow path caused by the filter frame and leading to a lower overall pressure drop. The reduced pleat height in the second edge pleat section can also be used to increase the space available for adding the adhesive into the channels. The reduced pleat height in the second edge pleat section can also be used to achieve a combination of both reduced size of the channels in the casing and increased space available for adding the adhesive into the channels.

Each pleat section typically has a single pleat height, but it is also possible that each pleat section has a range or sequence or gradient of different pleat heights. What is important for the purposes of the present disclosure is that the maximum pleat height in the second edge pleat section is lower than the maximum pleat height in the main pleat section. This allows for the edge pleat section to fit in a smaller channel, or for increasing the space available for adding the adhesive into the channels.

The length of the second edge pleat section may preferably be adapted to correspond to the depth of the channel in which it is to be inserted and sealed. However, it is also possible for the second edge pleat section to be much larger, e.g. such that the length of the second edge pleat section is up to 50% of the total length of the pleated filter element between the first noncorrugated edge and the second noncorrugated edge. This may for example be the case in an embodiment wherein the pleat height tapers from a middle pleat of the pleated filter element towards the second noncorrugated edge such that the pleated filter element has a maximum pleat height at the middle pleat and a minimum pleat height at the second noncorrugated edge pleat.

In some embodiments, the length of the second edge pleat section is 1-25%, preferably 1-20%, preferably 1-15%, preferably 1-10%, of the length of the pleated filter element between the first noncorrugated edge and the second noncorrugated edge. In a panel-type air filter, a deep pleat box air filter, or a V-type air filter, the length of the second edge pleat section in the range of 1-15% or 1-10% of the length of the pleated filter element between the first noncorrugated edge and the second noncorrugated edge is typically preferred as it will typically correspond to the depth of the channel in which the edge pleat section is to be inserted and sealed.

Common lengths of the pleated filter elements between the first noncorrugated edge and the second noncorrugated edge, in a direction perpendicular to the pleats, are in the range of 200-700 mm, such as in the range of 200-400 or 250-350 mm, or in the range of 350-500 or 390-450 mm, or in the range of 500-700 or 550-650 mm. In some embodiments, the length of the second edge pleat section is in the range of 5-60 mm, preferably in the range of 5-50 mm, preferably in the range of 5-40 mm, preferably in the range of 5-30 mm, preferably in the range of 10-60 mm, preferably in the range of 10-50 mm, preferably in the range of 10-40 mm, preferably in the range of 10-30 mm, more preferably in the range of 10-25 mm.

In some embodiments, the second edge pleat section comprises at least the first two, three, four, five, six, seven, eight, nine or ten pleats at the second noncorrugated edge.

The pleat height of the main pleat section may vary within a wide range depending on the type of filter and the overall size of the filter in which the pleated filter element is to be used. In some embodiments, the pleat height in the main pleat section is in the range of 5-300 mm, preferably in the range of 5-100 mm, more preferably in the range of 10-50 mm, and most preferably in the range of 10-25 mm. A pleated filter element having a large pleat height in the range of 100-300 mm may be used in a deep pleat box filter. Panel filters may typically use a pleated filter element having a pleat height in the range of 25-100 mm, and V-type filters may typically use a pleated filter element having a pleat height in the range of 10-50 mm or 10-25 mm.

In some embodiments, the maximum pleat height in the edge pleat section(s) is 1-75% lower than the maximum pleat height, preferably 1-50% lower than the maximum pleat height in the main pleat section. In some embodiments, the pleat height difference between the edge pleat section and the main pleat section corresponds to the thickness of the wall, typically in the range of 2-8 mm, of the channel in which the pleated filter element is to be sealed. This allows for major upstream face or a major downstream face main pleat section to be arranged flush with the outside wall of the channel.

In some embodiments, edge pleat sections have a low pleat height in order to fit in a narrow channel, whereas the main pleat section has a significantly higher pleat height in order to increase the amount of filter media in a filter.

The pleat height can be reduced or lowered relative to the major upstream face or relative to the major downstream face or both, depending for example on the desired profile of the pleated filter element at the edge pleat section(s). In some embodiments the pleat height in the edge pleat section(s) is reduced from said major upstream face. In some embodiments the pleat height in the edge pleat section(s) is reduced from said major downstream face. In some embodiments the pleat height in the edge pleat section(s) is reduced from both said major upstream face and said major downstream face.

In some embodiments, the pleat height in the edge pleat section(s) is reduced symmetrically from said major upstream face and/or from said major downstream face. This type of symmetrical reduction may be especially useful where the pleated filter element is arranged straight, such as in a panel type filter.

In some embodiments, the pleat height in the edge pleat section(s) is reduced from said major upstream face at one of the first and second noncorrugated edges and reduced from said major downstream stream face at the other of the first and second noncorrugated edges. This type of asymmetric reduction may be especially useful where the pleated filter element is arranged at a tilted angle in the filter frame, such as in a V-type filter.

Each pleat section typically has a single pleat height, but it is also possible that each pleat section has a range or sequence or gradient of different pleat heights. Thus, in some embodiments the pleat height is the same for all pleats in the main pleat section. In some embodiments, the pleat height is the same for all pleats in the edge pleat section(s). In some embodiments, the pleat height in the edge pleat section(s) is increasingly reduced towards the first or second noncorrugated edge.

In some embodiments, the pleated filter element further comprises a support structure configured to maintain the pleated filter media in a predefined rectangular shape and/or to facilitate manufacturing. The purpose of the support structure may be to maintain a desired separation between the pleats, to maintain the geometrical shape of the pleated filter element, and/or to improve the mechanical strength of the pleated filter element during handling and use. The support structure may include a range of different features including, but not limited to, glue, glue strings, adhered strips, scrims, edge banding and/or a frame structure. A support structure in the form of an edge banding or a frame structure may be applied to one or more of the edges of the filter element. In preferred embodiments, edge banding or a frame structure is applied to both of the corrugated edges of the pleated filter element. In some embodiments, the support structure is in the form of two elongated pots in which the first and second corrugated edge of the pleated filter element are enclosed and sealed by an adhesive. The elongated pots in which the first and second corrugated edge of the pleated filter element are sealed can in turn be enclosed and sealed to corresponding channels of a filter casing. The shape of the support structure is preferably adapted to the reduced pleat height at the edge pleat section(s) such that the pleated filter element with the support structure attached still fit in the channel of the filter casing as desired.

The pleated filter element according to the first aspect of the disclosure is preferably arranged in a casing. The casing seals the edges of the pleated filter element and typically allows for the pleated filter element to be conveniently mounted in a filter holding structure. The filter holding structure may for example comprise a filter housing or filter bank grid, with one or more openings in which the filters are fitted.

Thus, according to a second aspect of the disclosure, there is provided an air filter comprising:

a pleated filter element as defined above with reference to the first aspect; and a casing having the pleated filter element disposed therein.

The air filter may be a panel filter, a deep pleat box filter, or a V-type filter. A panel filter or a deep pleat box filter typically comprises a pleated filter element arranged in a casing comprising a rectangular or box-like frame. A V-type filter typically includes two or more pairs of pleated filter elements arranged in a V-configuration in a casing. The corrugated and noncorrugated edges of the filter element are typically enclosed in one or more channels in the casing where they can be sealed to the casing by adding, and subsequently setting, a liquid adhesive in the channels.

The corrugated and noncorrugated edges of the filter element can be sealed to the casing directly, or indirectly via an optional support structure.

In some embodiments, the air filter is a panel-type air filter comprising:

a pleated filter element as defined above with reference to the first aspect; and a casing comprising a rectangular frame enclosing the pleated filter element, said rectangular frame comprising a channel in which the first and second noncorrugated edge and the first and second corrugated edge of the pleated filter element are sealed by an adhesive.

The corrugated and noncorrugated edges of the filter element can be sealed to the casing directly, or indirectly via an optional support structure.

In some embodiments, the air filter is a V-type air filter comprising:

at least one pair of pleated filter elements as defined above with reference to the first aspect arranged in a V configuration;

a casing having the at least one pair of pleated filter elements disposed therein, said casing comprising at least two channels in which the first noncorrugated edges of the pleated filter elements are sealed by an adhesive, wherein an opening between said at least two channels defines a flow path for an air flow passing through the V-type air filter, and at least one channel in which the second noncorrugated edges of the pleated filter elements are sealed by an adhesive.

In some embodiments, the casing of the V-type air filter further comprises two side plates sealed to the first and second corrugated edges of the pleated filter elements respectively.

The corrugated and noncorrugated edges of the filter element can be sealed to the casing directly, or indirectly via an optional support structure.

In some embodiments, the at least two channels in which the first noncorrugated edges of the pleated filter elements are sealed, are arranged in a front frame of the casing, said at least one channel in which the second noncorrugated edges of the pleated filter elements are sealed, is arranged in an end plate of the casing, and said two side plates sealed to the first and second corrugated edges of the pleated filter elements are connected to the front frame and end plate respectively.

In some embodiments, the V-type air filter comprises at least two pairs, preferably three pairs or four pairs, of pleated filter elements, each pair arranged in a V configuration.

In order to secure the pleated filter elements to the casing and prevent air from bypassing the filter elements, the filter elements are typically adhered and sealed against the casing by means of an adhesive. The corrugated and noncorrugated edges of the filter element can be sealed to the casing directly, or indirectly via an optional support structure.

In some embodiments, the air filter conforms to the international standard ISO 16890 or the EN standard EN1822.

According to a third aspect of the disclosure, there is provided the use of a pleated filter element as defined above with reference to the first aspect, or an air filter as defined above with reference to the second aspect, for filtration of air at the air intake of a gas turbine.

Various embodiments of the invention will now be described more in detail with reference to the drawings.

BRIEF DESCRIPTION OF THE DRAWINGS

Referring now to the drawings, which are exemplary embodiments, and wherein.

DETAILED DESCRIPTION OF PREFERRED EMBODIMENTS

Figure 1A:
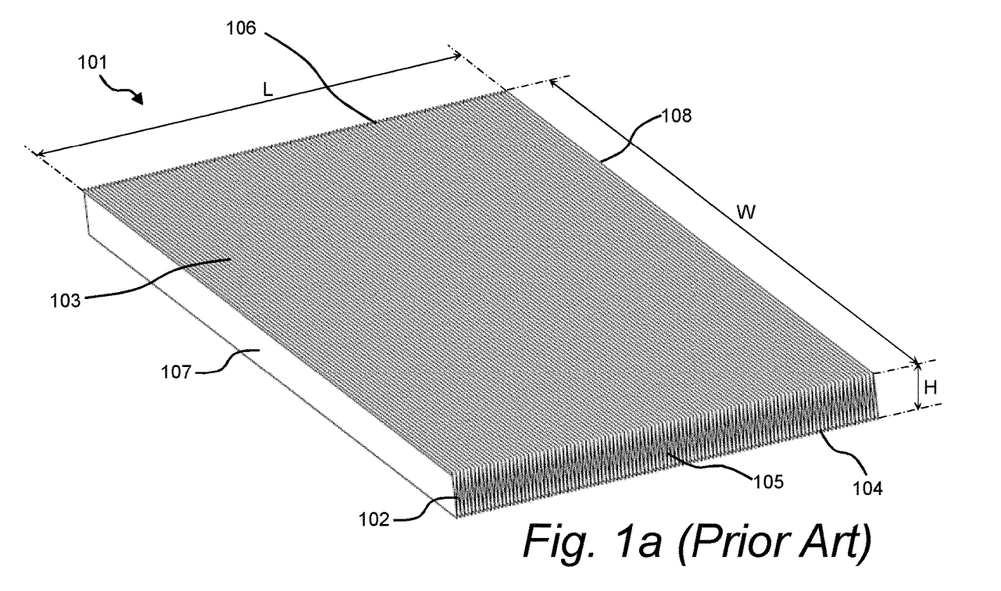
FIG. 1a is a perspective view of a prior art pleated filter element.
Figure 1B:
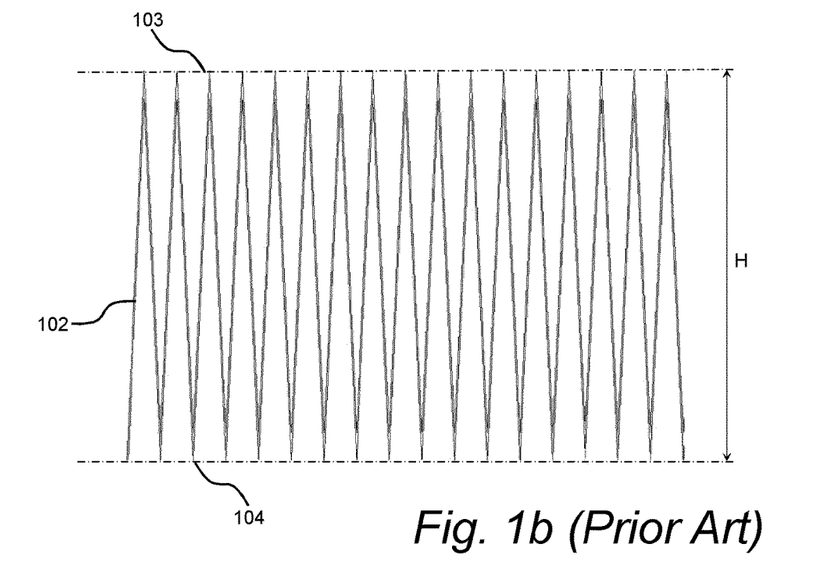
FIG. 1b is a cross sectional view of a prior art pleated filter element.

FIGS. 1a and 1b show a prior art pleated filter element. The pleated filter element can be arranged in a casing to form an air filter, such as a panel filter, a deep pleat box filter, or a V-type filter. The pleated filter element 101 consists of a pleated filter media 102. The pleated filter element 101 has a major upstream face 103 and a major downstream face 104 and comprising a plurality of oppositely-facing pleats extending between the major upstream face and the major downstream face such that the pleated filter element comprises a first corrugated edge 105 and a second corrugated edge 106 and a first noncorrugated edge 107 and a second noncorrugated edge 108. The pleated filter element 101 is rectangular in shape and the size of the filter element is characterized by a length L between the first noncorrugated edge 107 and the second noncorrugated edge 108, in a direction perpendicular to the pleats, a width W between the first corrugated edge 105 and the second corrugated edge 106, in a direction parallel to the pleats, and a thickness D between the major upstream face 103 and the major downstream face 104, corresponding to the pleat height. The major upstream and major downstream surfaces are planes intersecting the upstream and downstream pleat tips respectively. In this document pleat height refers to the shortest distance between the major upstream face and the major downstream face, i.e. typically the distance in a direction orthogonal to the major upstream face or the major downstream face, or both. The length L and thickness D refer to the overall length and thickness of the filter element 101 in the folded state and not to the length or thickness of the filter media 102 in a stretched-out state.

The pleated filter media 102 may be, e.g., a fiberglass sheet, or a nonwoven polyester sheet or membrane media or combinations thereof or the like, which is pleated to increase the effective filtering area of the filter body. It may also be a molecular filtration media, e.g. a nonwowen material containing an adsorbent for gas uptake in particulate form, such as fibers, granules or spheres. A filter media for particle separation has the specific ability to remove particles of different sizes from the air stream depending on the media type and will by that typically conform to any of the standards ISO 16890 or EN 1822. A filter media for molecular filtration has similarly a specific ability to remove different types of gaseous compounds from the air stream. The gaseous compounds removed depend on the media type.

Figure 2A:
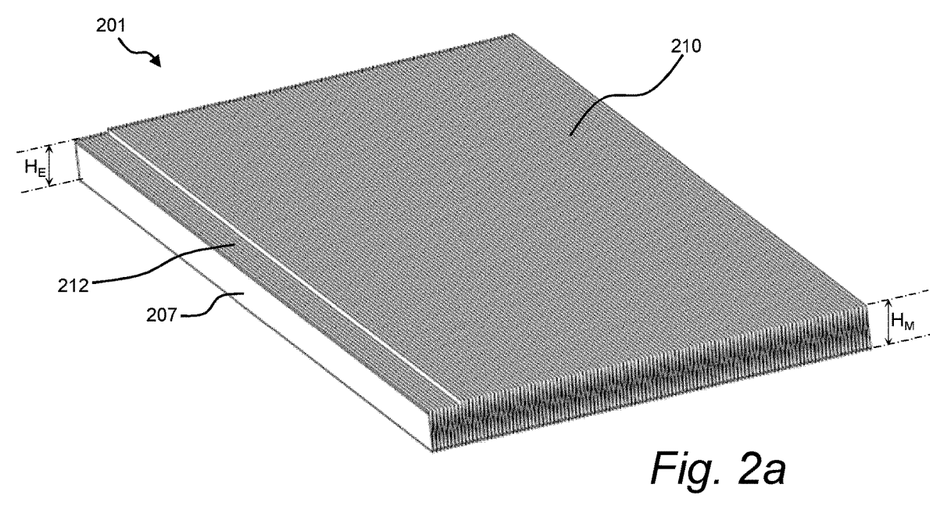
FIG. 2a is a perspective view of an embodiment of the inventive pleated filter element.
Figure 2B:
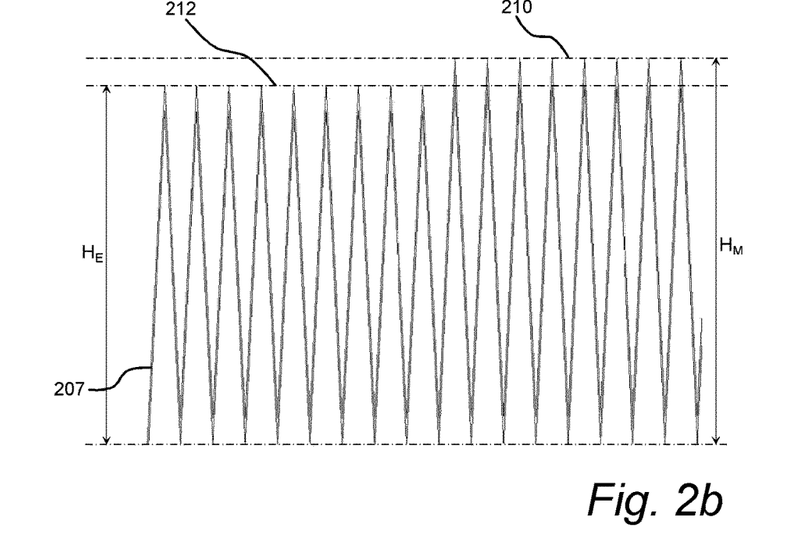
FIG. 2b is a cross sectional view of an embodiment of the inventive pleated filter element.

FIGS. 2a and 2b show an embodiment of the inventive pleated filter element. The pleated filter element 201 differs from the prior art pleated filter element 101 in that it has a main pleat section 210 and a first edge pleat section 212 at the first noncorrugated edge 207, wherein the maximum pleat height $H_E$ in the first edge pleat section is lower than the maximum pleat height $H_M$ in the main pleat section.

The pleated filter element 201 comprises a section of pleats at the first noncorrugated edge, the first edge pleat section 212, wherein maximum pleat height $H_E$ in the first edge pleat section 212 is lower than the maximum pleat height $H_M$ in the main pleat section 210. A casing for holding the pleated filter element typically comprises a number of channels in which the edges of the filter element are sealed by an adhesive. The reduced pleat height in the first edge pleat section 212 allows for the size of the channels in the casing to be reduced, thereby reducing obstructions of the air flow path caused by the casing and leading to a lower overall pressure drop. Conversely this may also allow for selecting a pleat height in the main pleat section that is higher than the one that would be selected based on other space limitations. The reduced pleat height in the first edge pleat section can also be used to increase the space available for adding the adhesive into the channels. The reduced pleat height in the first edge pleat section can also be used to achieve a combination of reduced size of the channels in the casing, increased pleat height in the main section and increased space available for adding the adhesive into the channels.

In FIGS. 2a and 2b each pleat section has a single pleat height, but it is also possible that each pleat section has a range or sequence or gradient of different pleat heights. What is important for the purposes of the present disclosure is that the maximum pleat height in the first edge pleat section 212 is lower than the maximum pleat height in the main pleat section 210. This allows for the edge pleat section to fit in a smaller channel, or for increasing the space available for adding the adhesive into the channels.

Figure 3A:
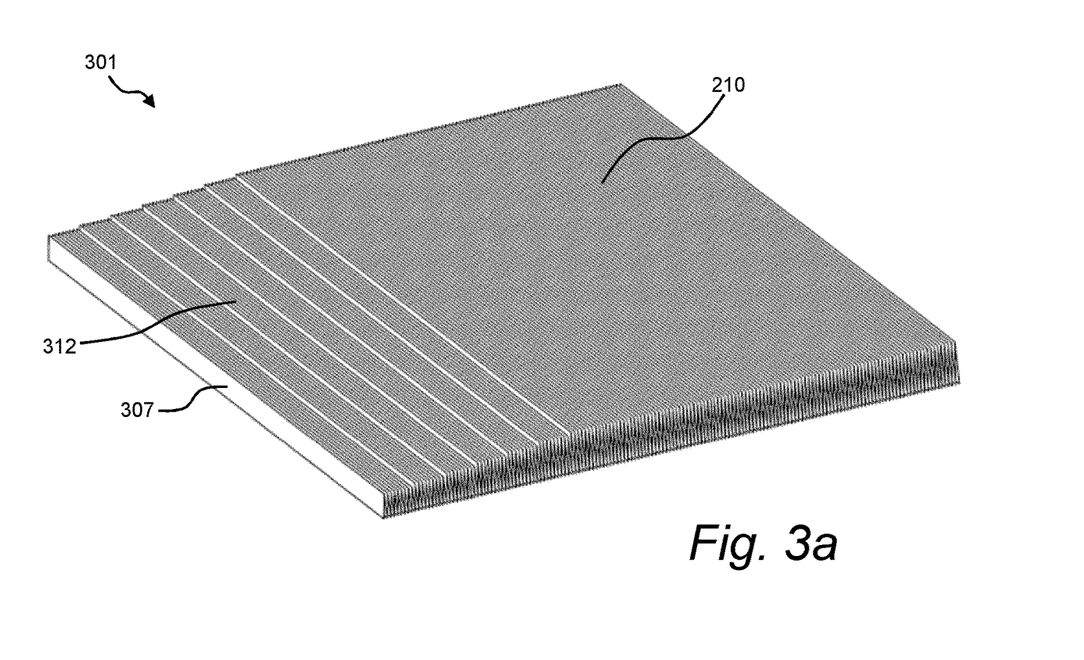
FIG. 3a is a perspective view of an embodiment of the inventive pleated filter element.
Figure 3B:
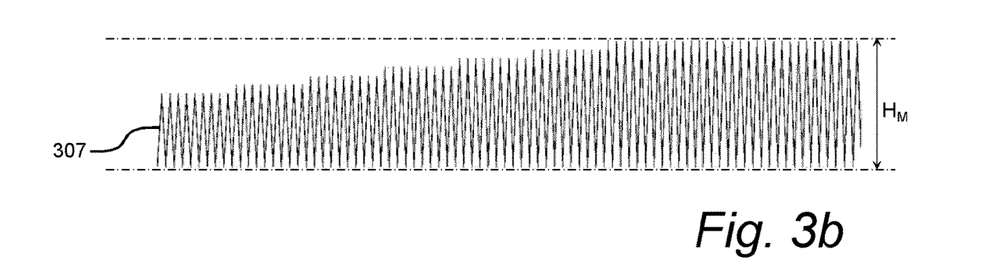
FIG. 3b is a cross sectional view of an embodiment of the inventive pleated filter element.

FIGS. 3a and 3b show an embodiment of the inventive pleated filter element 301 where the pleat height in the first edge pleat section 312 is increasingly reduced towards the first noncorrugated edge 307. Thereby, the first edge pleat section 312 can have a low pleat height in order to fit in a narrow channel, whereas the main pleat section 310 can have a significantly higher pleat height in order to increase the amount of filter media in a filter.

The size of the pleat sections is characterized by the length of the pleat section in a direction between the first noncorrugated edge and the second noncorrugated edge. This length refers to the overall length of the filter element in the folded state and not to the length of the filter media in a stretched-out state. The length of the first edge pleat section may preferably be adapted to correspond to the depth of the channel in which it is to be inserted and sealed. However, it is also possible for the first edge pleat section to be much larger, e.g. such that the length of the first edge pleat section is up to 50% of the total length of the pleated filter element between the first noncorrugated edge and the second noncorrugated edge. This may for example be the case in an embodiment wherein the pleat height tapers from a middle pleat of the pleated filter element towards the first noncorrugated edge such that the pleated filter element has a maximum pleat height at the middle pleat and a minimum pleat height at the first noncorrugated edge pleat.

In some embodiments, the length of the first edge pleat section is 1-25%, preferably 1-20%, preferably 1-15%, preferably 1-10%, of the length of the pleated filter element between the first noncorrugated edge and the second noncorrugated edge. In some embodiments, the length of the first edge pleat section is in the range of 5-100 mm, preferably in the range of 5-50 mm, more preferably in the range of 5-25 mm. The first edge pleat section comprises a series of pleats at the first noncorrugated edge. In some embodiments, the first edge pleat section comprises at least the first two, three, four, five, six, seven, eight, nine or ten pleats at the first noncorrugated edge.

The pleated filter element can be arranged in a casing to form an air filter, such as a panel filter, a deep pleat box filter, or a V-type filter. A panel filter or a deep pleat box filter typically comprises a pleated filter element arranged in a casing comprising a rectangular or box-like frame. A V-type filter typically includes two or more pairs of pleated filter elements arranged in a V-configuration in a casing. The corrugated and noncorrugated edges of the filter element are typically enclosed in one or more channels in the casing where they can be sealed to the casing by adding a liquid adhesive in the channels and allowing the liquid adhesive to solidify. The corrugated and noncorrugated edges of the filter element can be sealed to the casing directly, or indirectly via an optional support structure. The support structure may include a range of different features including, but not limited to, glue, glue strings, adhered strips, scrims, edge banding and/or a frame structure. A support structure in the form of an edge banding or a frame structure may be applied to one or more of the edges of the filter element. In preferred embodiments, edge banding or a frame structure is applied to both of the corrugated edges of the pleated filter element. In some embodiments, the support structure is in the form of two elongated pots in which the first and second corrugated edge of the pleated filter element are enclosed and sealed by an adhesive. The elongated pots in which the first and second corrugated edge of the pleated filter element are sealed can in turn be enclosed and sealed to corresponding channels of a filter casing. The shape of the support structure is preferably adapted to the reduced pleat height at the edge pleat section(s) such that the pleated filter element with the support structure attached still fit in the channel of the filter casing as desired.

The pleat height can be reduced relative to the major upstream face or relative to the major downstream face or both, depending for example on the desired profile of the pleated filter element at the edge pleat section(s). In some embodiments the pleat height in the edge pleat section(s) is reduced from said major upstream face. In some embodiments the pleat height in the edge pleat section(s) is reduced from said major downstream face. In some embodiments the pleat height in the edge pleat section(s) is reduced from both said major upstream face and said major downstream face.

In some embodiments, the pleat height in the edge pleat section(s) is reduced symmetrically from said major upstream face and/or from said major downstream face. This type of symmetrical reduction may be especially useful where the pleated filter element is arranged straight, such as in a panel type filter.

In some embodiments, the pleat height in the edge pleat section(s) is reduced from said major upstream face at one of the first and second noncorrugated edges and reduced from said major downstream stream face at the other of the first and second noncorrugated edges. This type of asymmetric reduction may be especially useful where the pleated filter element is arranged at a tilted angle in the filter frame, such as in a V-type filter.

The pleat height of the main pleat section may vary within a wide range depending on the type of filter and the overall size of the filter in which the pleated filter element is to be used. In some embodiments, the pleat height in the main pleat section is in the range of 5-300 mm, preferably in the range of 5-100 mm, more preferably in the range of 10-50 mm, and most preferably in the range of 15-35 mm. A pleated filter element having a large pleat height in the range of 100-300 mm may be used in a deep pleat box filter. Panel filters may typically use a pleated filter element having a pleat height in the range of 25-100 mm, and V-type filters may typically use a pleated filter element having a pleat height in the range of 10-50 mm or 10-25 mm.

In some embodiments, the maximum pleat height in the edge pleat section(s) is 1-75% lower than the maximum pleat height, preferably 1-50% lower than the maximum pleat height in the main pleat section. In some embodiments, the pleat height difference between the edge pleat section and the main pleat section corresponds to the thickness of the wall, typically in the range of 2-8 mm, of the channel in which the pleated filter element is to be sealed. This allows for major upstream face or a major downstream face main pleat section to be arranged flush with the outside wall of the channel.

The pleat height can be reduced relative to the major upstream face or relative to the major downstream face or both, depending for example on the desired profile of the pleated filter element at the edge pleat section(s). In some embodiments the pleat height in the edge pleat section(s) is reduced from said major upstream face. In some embodiments the pleat height in the edge pleat section(s) is reduced from said major downstream face. In some embodiments the pleat height in the edge pleat section(s) is reduced from both said major upstream face and said major downstream face.

In some embodiments, the pleat height in the edge pleat section(s) is reduced symmetrically from said major upstream face and/or from said major downstream face. This type of symmetrical reduction may be especially useful where the pleated filter element is arranged straight, such as in a panel type filter.

Figure 4:
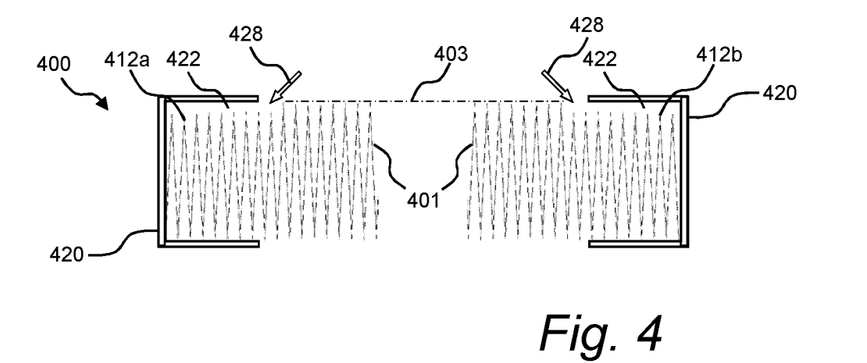
FIG. 4 is a schematic cross-sectional view of an embodiment of the inventive pleated filter element in a panel filter.

FIG. 4 schematically shows the position of the pleated filter element 401 in the rectangular frame casing 420 of a panel filter 400. The pleat height in the edge pleat section(s) 412a, 412b is reduced symmetrically from said major upstream face 403. The reduced pleat height in the first and second edge pleat sections 412a, 412b increases the space available for adding the adhesive, as indicated by arrows 428, into the channels 422 of the casing 420 without reducing the effective filtration area of the filter element 401. It is understood that the pleated filter element in FIG. 4 could also have the pleat height in the edge pleat section(s) reduced symmetrically from both of the major upstream face and the major downstream face. Reduced pleat height from both of the major upstream face and the major downstream face edge pleat sections increases the space available for adding adhesive into the channels of the casing on both the upstream and downstream side, without reducing the effective filtration area of the filter element.

In some embodiments, the pleat height in the edge pleat section(s) is reduced from said major upstream face at one of the first and second noncorrugated edges and reduced from said major downstream stream face at the other of the first and second noncorrugated edges. This type of asymmetric reduction may be especially useful where the pleated filter element is arranged at a tilted angle in the filter frame, such as in a V-type filter.

Figure 5:
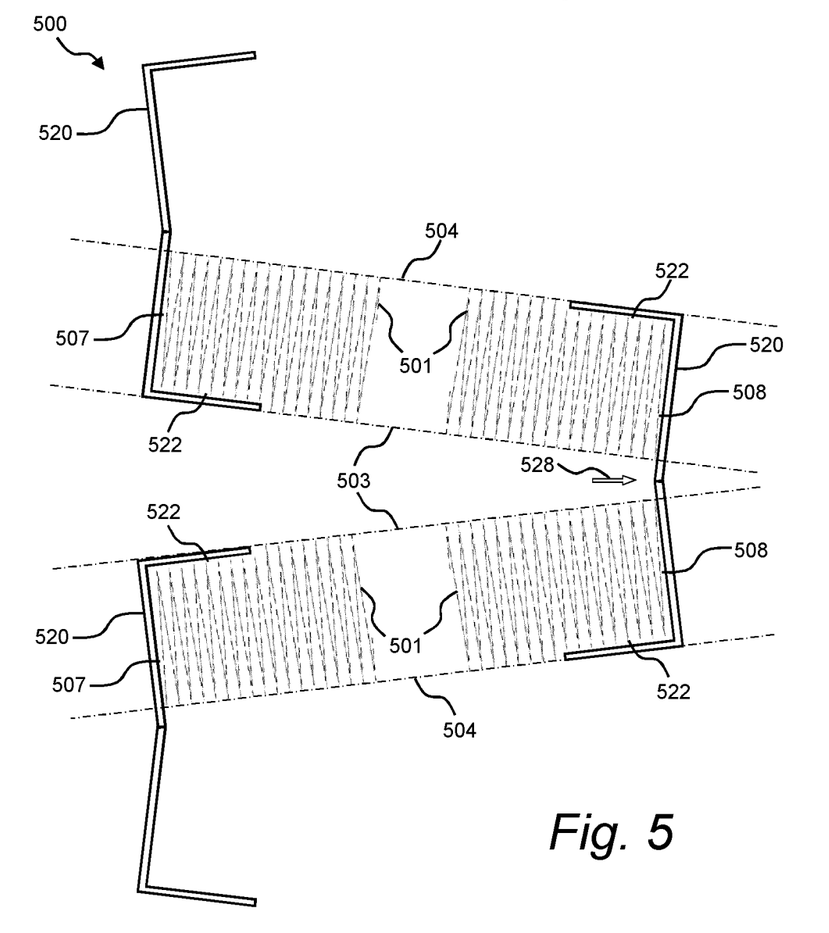
FIG. 5 is a schematic cross-sectional view of an embodiment of the inventive pleated filter element in a V-type filter.

FIG. 5 schematically shows the position of the pleated filter element 501 in the casing 520 of a V-type filter 500. The pleat height in the first edge pleat section is reduced from said major upstream face 503 at the first noncorrugated edge 507 and reduced from said major downstream stream face 504 at the second noncorrugated edge 508. With the reduced pleat height, the major upstream and downstream faces 503, 504 are arranged flush with the outside walls of the channels 522. The reduced pleat height in the first and second edge pleat section allows for the size of the channels in the casing to be reduced, thereby reducing obstructions of the air flow path caused by the filter frame and leading to a lower overall pressure drop. The reduced pleat height in the first and second edge pleat section can also be used to increase the space available for adding the adhesive, as indicated by arrow 528, into the channels. The reduced pleat height in the first and second edge pleat section can also be used to achieve a combination of both reduced size of the channels in the casing and increased space available for adding the adhesive into the channels. The improvements can be achieved without reducing the effective filtration area of the filter element and conversely allow for a maximized pleat height.

Figure 6:
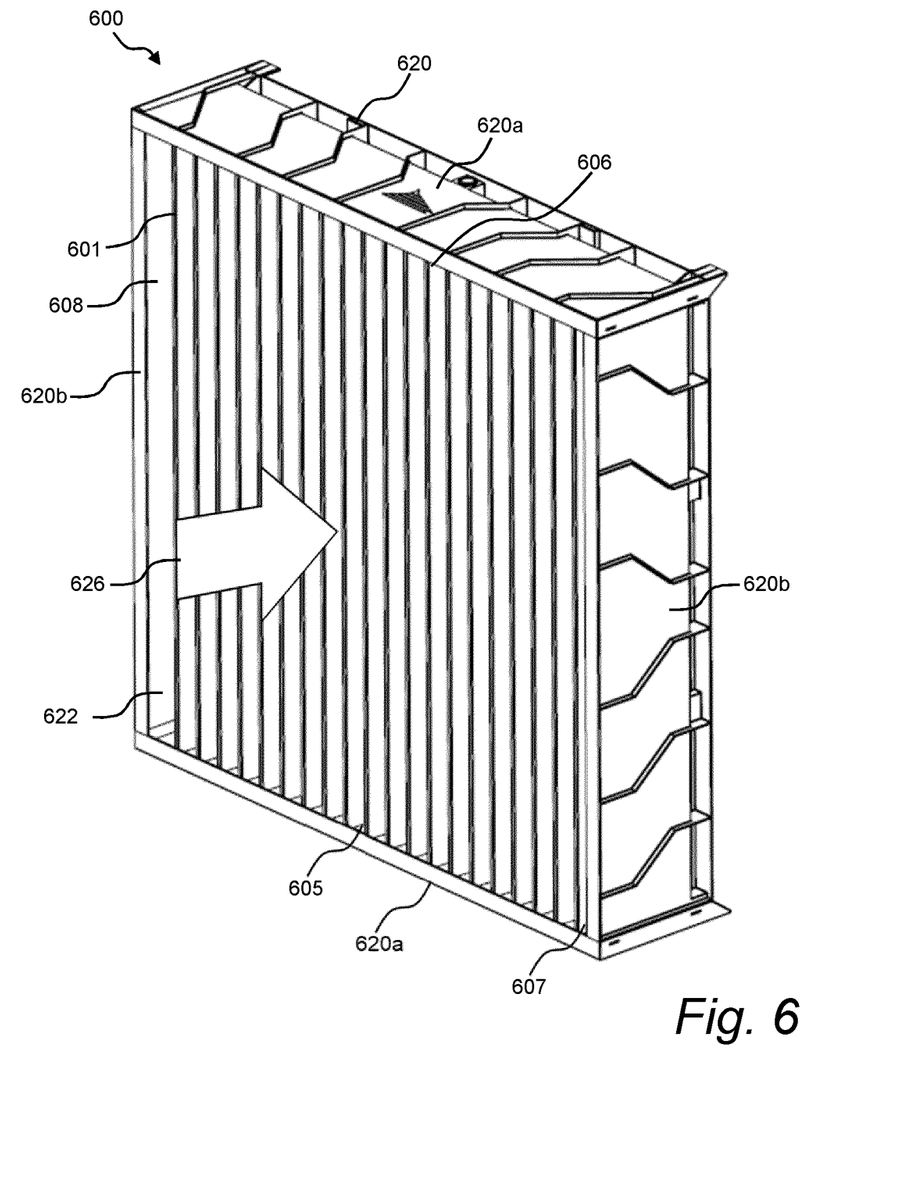
FIG. 6 is a perspective view of a panel filter.

The air filter will be further described with reference to embodiments in which the air filter is a panel filter and a V-type air filter respectively FIG. 6 shows an embodiment in which the air filter is a panel filter. The panel filter 600 has a pleated filter element 601 and a rectangular filter casing 620 having the pleated filter element 601 disposed therein. The rectangular filter casing 620 defines a rectangular aperture for receiving an air flow 626 to be filtered. The pleated filter element 601 is of the type shown in FIG. 4. The filter casing 620 includes a first pair of opposing side plates 620a sealed to the corrugated edges 605, 606 of the pleated filter element and a second pair of opposing side plates 620b sealed to the noncorrugated edges 607, 608 of the rectangular pleated filter element. The rectangular filter casing 620 comprises a channel 622 at the inside facing surface thereof, in which the first and second noncorrugated edge and the first and second corrugated edge of the pleated filter element 601 are sealed by an adhesive. The reduced pleat height in the first and second edge pleat section increases the space available for adding the adhesive into the channels of the casing without reducing the effective filtration area of the filter element. It is understood that the pleated filter element in FIG. 6 could also have the pleat height in the edge pleat section(s) reduced symmetrically from both of the major upstream face and the major downstream face. Reduced pleat height from both of the major upstream face and the major downstream face edge pleat sections increases the space available for adding adhesive into the channels of the casing on both the upstream and downstream side, without reducing the effective filtration area of the filter element.

Figure 7:
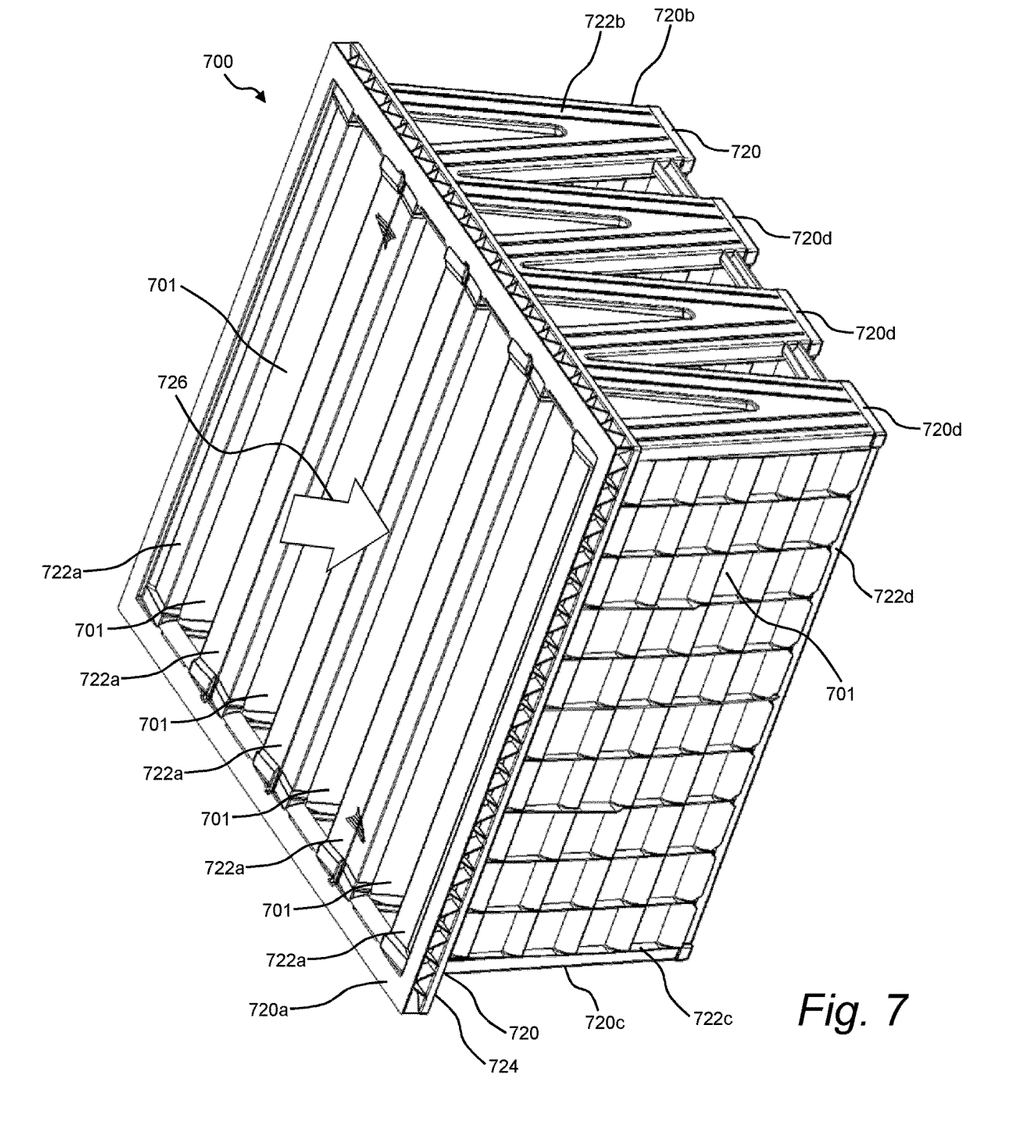
FIG. 7 is a perspective view of a V-type filter.
Figure 8:
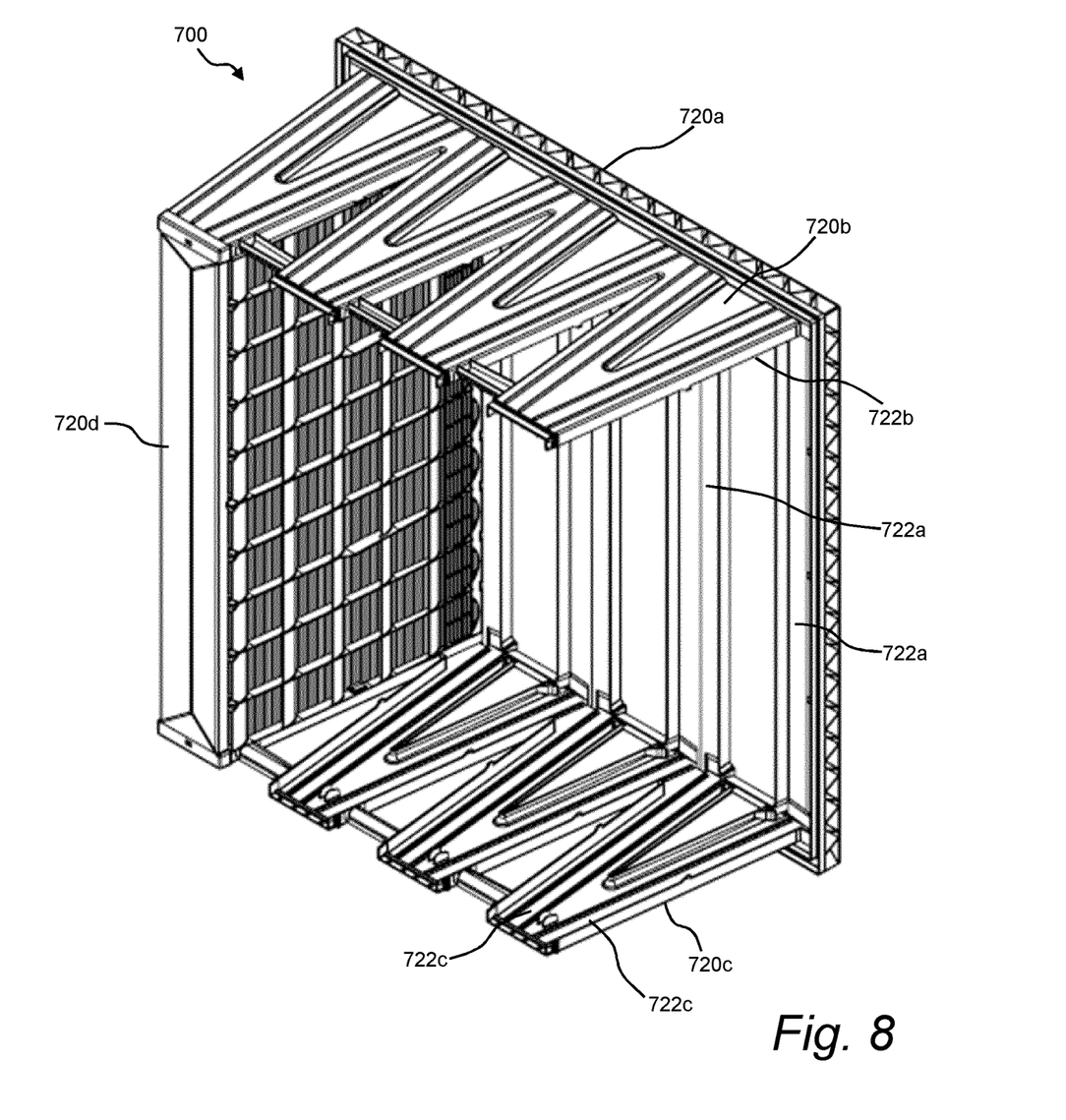
FIG. 8 is a perspective view of a partially assembled casing of a V-type filter.

FIGS. 7 and 8 show an embodiment in which the air filter is a V-type air filter. The V-type air filter 700 comprises a filter casing 720, and several, in this embodiment eight, rectangular pleated filter elements 701 carried by the filter casing. The pleated filter elements 701 are of the type shown in FIG. 5. The filter elements 701 are arranged in pairs in a V configuration having an open end, a closed end and two V-shaped ends. Although the invention will be described mainly with reference to a 4V embodiment, it is understood that the invention is equally applicable to 1V, 2V, 3V or more V configurations, i.e. filter assemblies comprising 2, 4, 6, or more filter elements.

The filter casing 720 comprises a front frame 720a, here in the form of a one-piece injection molded front plate, two side plates 720b, 720c and a rear plate, embodied by four separate rear plate elements 720d. The front frame, side plates and rear plate are all provided with channels for accommodating the edges of the pleated filter elements. The front frame 720a is rectangular and comprises a peripherally extending rim 724, and parallel channels 722a extending between opposite rim sides of the front frame 720a.

In order to secure the filter elements to the casing and prevent air from bypassing the filter elements, the filter elements are adhered and sealed against the casing structure by means of an adhesive. The front frame is sealed to the filter elements at the open end, the rear plate elements are sealed to the filter elements at the closed end, and the two side plates are connected to the front and rear plates and sealed to the filter elements at the V-shaped ends. Consequently, the front frame, the side plates, and the rear plate support each other to form a strong filter casing, which carries the filter elements 701.

The pleated filter elements are arranged such that the corrugated edges of the rectangular pleated filter elements 701 are sealed to the channels 722b, 722c of the side plates 720b, 720c, and the noncorrugated edges of the rectangular pleated filter elements 701 are sealed to the channels 722a of the front frame and the channels 722d of the rear plates respectively.

V-type air filters are provided in a wide variety of sizes. A common type has a substantially square front frame of about 600×600 mm. The height of the front frame may vary, but is often 20 mm or 25 mm.

The air flow direction through the filter is indicated by arrow 726. The direction of the arrow is orientated as V-type filters are typically utilized. However, it is understood that V-type filters may also be mounted in the opposite orientation.

During operation, air to be filtered is passed in the direction of the arrow from a "dirty" upstream side to a "clean" downstream side of the filter. The air to be filtered passes through a rectangular aperture defined by the front frame, and into a V-shaped upstream space defined by the pair of filter elements forming a V-shape, and the opposing side plates at the V-shaped ends of the space. The air then passes through the porous filter media of the filter elements to the "clean" downstream side of the filter.

The inventive pleated filter elements allow for the total open area of the front frame and/or rear plate(s) to be increased since the size of the channels can be reduced. They also allow for increasing the space available for adding the adhesive into the channels. Conversely this may also allow for selecting a pleat height in the main pleat section that is higher than the one that would be selected based on other space limitations.

While the invention has been described herein with reference to various exemplary embodiments, it will be understood by those skilled in the art that various changes may be made, and equivalents may be substituted for elements thereof, without departing from the scope of the invention. In addition, many modifications may be made to adapt a particular situation or feature to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, it would be understood by the person skilled in the art what features of the different embodiments can be combined although not explicitly written above.

The invention claimed is:

1. A V-type air filter comprising:
   at least one pair of pleated filter elements arranged in a V configuration in a casing,
   wherein said pleated filter elements comprise:
   a pleated filter media comprising a major upstream face and a major downstream face and comprising a plurality of oppositely-facing pleats extending between said major upstream face and said major downstream face such that the pleated filter media comprises a first corrugated edge and a second corrugated edge and a first noncorrugated edge and a second noncorrugated edge, and
   wherein said casing includes channels adapted to enclose the corrugated and noncorrugated edges of the filter elements, and in which the corrugated and noncorrugated edges are inserted and sealed, said channels having a depth and one or more outside walls, and
   wherein the pleated filter media comprises:
      a main pleat section extending between a major upstream face and a major downstream face, said major upstream face and said major downstream face being arranged flush with the outside walls of the channel enclosing the noncorrugated edges of the filter elements, wherein the pleat height is the same for all pleats in the main pleat section and corresponds to the distance between said major upstream face and said major downstream face; and
      a first edge pleat section at the first noncorrugated edge, wherein the length of the first edge pleat section corresponds to the depth of the channel in which it is to be inserted and sealed, and is 1-25% of the total length of the pleated filter element between the first noncorrugated edge and the second noncorrugated edge,
      wherein the maximum pleat height in the first edge pleat section is lower than the maximum pleat height in the main pleat section, and wherein reduced pleat height in the first edge pleat section allows the first edge pleat section to fit into the channel and allows for the size of the channels in the casing to be reduced, thereby reducing obstructions of the air flow path caused by the filter casing and leading to a lower overall pressure drop.

2. The V-type air filter according to claim 1, wherein the length of the first edge pleat section is 1-20%, of the length of the pleated filter element between the first noncorrugated edge and the second noncorrugated edge.

3. The V-type air filter according to claim 2, wherein the length of the first edge pleat section is in the range of 5-60 mm.

4. The V-type air filter according to claim 2, wherein the first edge pleat section comprises at least the first two pleats at the first noncorrugated edge.

5. The V-type air filter according to claim 1, wherein the pleated filter media further comprises:
a second edge pleat section at the second noncorrugated edge, wherein the length of the second edge pleat section is 1-25% of the total length of the pleated filter element between the first noncorrugated edge and the second noncorrugated edge, and wherein the maximum pleat height in the second edge pleat section is lower than the maximum pleat height in the main pleat section.

6. The V-type air filter according to claim 5, wherein the length of the second edge pleat section is 1-20% of the length of the pleated filter element between the first noncorrugated edge and the second noncorrugated edge.

7. The V-type air filter according to claim 6, wherein the length of the second edge pleat section is in the range of 5-60 mm.

8. The V-type air filter according to claim 7, wherein the second edge pleat section comprises at least the first two, three, four, five, six, seven, eight, nine or ten pleats at the second noncorrugated edge.

9. The V-type air filter according to claim 5, wherein the pleat height in the main pleat section is in the range of 5-300 mm.

10. The V-type air filter according to claim 9, wherein the maximum pleat height in the edge pleat section(s) is 1-75% lower than the maximum pleat height in the main pleat section.

11. The V-type air filter according claim 10, wherein the pleat height in the edge pleat section(s) is reduced from said major upstream face, from said major downstream face, or from both said major upstream face and said major downstream face.

12. The V-type air filter according claim 10, wherein the pleat height in the edge pleat section(s) is reduced from said major upstream face at one of the first and second noncorrugated edges and reduced from said major downstream stream face at the other of the first and second noncorrugated edges.

13. The V-type air filter according to claim 1, wherein the pleat height is the same for all pleats in the edge pleat section(s).

14. The V-type air filter according to claim 1, wherein the pleat height in the edge pleat section(s) is increasingly reduced towards the first or second noncorrugated edge.

15. The V-type air filter according to claim 1, wherein said at least one pair of pleated filter elements further comprises:
a support structure configured to maintain the pleated filter media in a predefined rectangular shape.

16. The V-type air filter according to claim 15, wherein the shape of said support structure is adapted to the reduced pleat height at the edge pleat section(s).

17. The V-type air filter according to claim 1, wherein the V-type air filter is a V-type air filter comprising:
at least one pair of pleated filter elements arranged in a V configuration;
a casing having the at least one pair of pleated filter elements disposed therein, said casing comprising:
at least two channels in which the first noncorrugated edges of the pleated filter elements are sealed by an adhesive, wherein an opening between said at least two channels defines a flow path for an air flow passing through the V-type air filter; and
at least one channel in which the second noncorrugated edges of the pleated filter elements are sealed by an adhesive.

18. The V-type air filter according to claim 17, said casing further comprising:
two side plates sealed to the first and second corrugated edges of the pleated filter elements respectively.

19. The V-type air filter according to claim 18, wherein said at least two channels in which the first noncorrugated edges of the pleated filter elements are sealed are arranged in a front frame of the casing, said at least one channel in which the second noncorrugated edges of the pleated filter elements are sealed is arranged in an end plate of the casing, and said two side plates sealed to the first and second corrugated edges of the pleated filter elements are connected to the front frame and end plate respectively.

20. The V-type air filter according to claim 19, wherein the V-type air filter comprises at least two pairs of pleated filter elements, each pair arranged in a V configuration.

21. The V-type air filter according to claim 1, wherein the V-type air filter conforms to the standard ISO 16890 or the standard EN 1822.

22. A method for filtering air at the air intake of a gas turbine, the method comprising:
introducing air through the filter of claim 1 into a gas turbine.

* * * * *